United States Patent
Kessler

(10) Patent No.: US 10,754,519 B2
(45) Date of Patent: Aug. 25, 2020

(54) GRAPHICAL USER INTERFACE FACILITATING UPLOADING OF ELECTRONIC DOCUMENTS TO SHARED STORAGE

(71) Applicant: Microsoft Technology Licensing, LLC, Redmond, WA (US)

(72) Inventor: Jade Kessler, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 50 days.

(21) Appl. No.: 15/454,837

(22) Filed: Mar. 9, 2017

(65) Prior Publication Data

US 2018/0260100 A1 Sep. 13, 2018
US 2019/0369844 A9 Dec. 5, 2019

Related U.S. Application Data

(63) Continuation-in-part of application No. 14/788,761, filed on Jun. 30, 2015, now Pat. No. 10,154,078.

(51) Int. Cl.
*G06F 3/00* (2006.01)
*G06F 3/0484* (2013.01)
(Continued)

(52) U.S. Cl.
CPC ........ *G06F 3/04842* (2013.01); *G06F 3/0481* (2013.01); *G06F 3/0484* (2013.01);
(Continued)

(58) Field of Classification Search
CPC ......... G06F 21/6218; G06F 2221/2111; G06F 17/30011; G06F 17/30221;
(Continued)

(56) References Cited

U.S. PATENT DOCUMENTS 8,108,464 B1  1/2012  Rochelle et al.
8,538,942 B2  9/2013  Barker et al.
(Continued)

FOREIGN PATENT DOCUMENTS

WO  2012149508 A2  11/2012
WO  2014126645 A1   8/2014

OTHER PUBLICATIONS

"Conflict Resolution and Subscription Limits", Retrieved from <<https://knowledge.springcm.com/conflict-resolution-and-subscription-limits>>, Retrieved on: Dec. 11, 2015, 11 Pages.
(Continued)

*Primary Examiner* — Di Xiao
(74) *Attorney, Agent, or Firm* — Alleman Hall Creasman & Tuttle LLP

(57) ABSTRACT

In an end user application running on a computer, for collaborative modification of shared electronic documents, a graphical user interface is provided that facilitates identifying other users to collaborate with and for storing an electronic document in shared storage. This graphical user interface includes a graphical element that conveys information about shared status of the currently accessed electronic document to the end user. Through input devices of the end user computer, an end user can manipulate this graphical element. Certain manipulations of this graphical element instruct the end user computer to determine if the electronic document can be shared. If the document can be shared, the graphical user interface prompts the user for additional users with whom the document is to be shared and then stores the document in shared storage. A graphical user interface that allows an electronic document to be quickly shared improves user efficiency and productivity in collaborative authoring.

20 Claims, 7 Drawing Sheets

(51) Int. Cl.
- *H04L 29/08* (2006.01)
- *G06F 16/93* (2019.01)
- *G06F 3/0481* (2013.01)
- *H04L 29/06* (2006.01)
- *G06F 40/166* (2020.01)

(52) U.S. Cl.
CPC .......... *G06F 16/93* (2019.01); *G06F 40/166* (2020.01); *H04L 65/403* (2013.01); *H04L 67/1097* (2013.01); *H04L 67/125* (2013.01); *G06F 2203/04803* (2013.01)

(58) Field of Classification Search
CPC .. G06F 17/30233; G06F 21/60; G06F 21/316; G06F 21/32; G06F 21/602; G06F 17/211; G06F 17/30867; G06F 17/30994; G06F 3/0485; G06F 17/2229; G06F 17/2247; G06F 17/2264; G06F 17/2288; G06F 17/24; G06F 17/248; G06F 17/3051; G06F 21/6245
See application file for complete search history.

(56) References Cited

U.S. PATENT DOCUMENTS

| | | | |
|---|---|---|---|
| 8,799,829 | B2 | 8/2014 | Grosz et al. |
| 8,856,907 | B1* | 10/2014 | Tidd .................... H04L 63/0815 713/155 |
| 8,949,179 | B2 | 2/2015 | Besen et al. |
| 9,294,550 | B2 | 3/2016 | Song et al. |
| 9,497,263 | B2 | 11/2016 | Chakravarthy et al. |
| 9,807,073 | B1* | 10/2017 | Miller ..................... H04L 63/08 |
| 10,154,078 | B2 | 12/2018 | Kessler et al. |
| 2006/0026502 | A1 | 2/2006 | Dutta |
| 2008/0095373 | A1* | 4/2008 | Nagata ..................... H04L 63/10 380/278 |
| 2009/0024609 | A1 | 1/2009 | Barker et al. |
| 2009/0260060 | A1* | 10/2009 | Smith .................... G06Q 10/10 726/3 |
| 2010/0257457 | A1 | 10/2010 | De Goes |
| 2012/0233543 | A1 | 9/2012 | Vagell et al. |
| 2013/0067090 | A1 | 3/2013 | Batrouni et al. |
| 2013/0124458 | A1 | 5/2013 | Barreto et al. |
| 2013/0174191 | A1 | 7/2013 | Thompson et al. |
| 2014/0026025 | A1 | 1/2014 | Smith |
| 2014/0040329 | A1* | 2/2014 | Lavin ................ G06F 17/30115 707/822 |
| 2014/0067929 | A1 | 3/2014 | Kirigin et al. |
| 2014/0156594 | A1 | 6/2014 | Kuo |
| 2015/0032840 | A1 | 1/2015 | Daly et al. |
| 2015/0039448 | A1 | 2/2015 | Byrne |
| 2015/0112817 | A1 | 4/2015 | Hamilton |
| 2015/0134751 | A1* | 5/2015 | Meyers, Jr. ............. H04L 51/08 709/206 |
| 2015/0288756 | A1 | 10/2015 | Larabie-Belanger |
| 2015/0304388 | A1 | 10/2015 | Procopio et al. |
| 2015/0331752 | A1 | 11/2015 | Haider et al. |
| 2015/0382244 | A1 | 12/2015 | Lau et al. |
| 2016/0028806 | A1* | 1/2016 | Wareing .............. H04L 67/1021 709/217 |
| 2016/0119293 | A1 | 4/2016 | Leon |
| 2016/0140139 | A1 | 5/2016 | Torres et al. |
| 2016/0140177 | A1 | 5/2016 | Chamberlin et al. |
| 2016/0274904 | A1 | 9/2016 | Niazi et al. |
| 2017/0003830 | A1* | 1/2017 | Kessler ............... H04L 67/1097 |
| 2017/0134495 | A1 | 5/2017 | Jang et al. |
| 2019/0141115 | A1 | 5/2019 | Kessler et al. |

OTHER PUBLICATIONS

"Contributing Screenshots, Artwork and Videos to the Steam Community", Retrieved from <<https://web.archive.org/web/20131222040446/http://steamcommunity.com//sharedfiles/filedetails/?id=181142704>>, Retrieved on: Nov. 12, 2015, 9 Pages.

"Setting Up Upselling Incentives", Retrieved From <<https://docs.oracle.com/cd/E26180_01/Platform.94/ATGCommStoreGuide/html/s0504settingupupsellingincentives01.html>>, Retrieved on: Jan. 24, 2017, 3 Pages.

Conger, Kevin, "Microsoft Office 2016 Has Been Released", Retrieved from <<https://www.linkedin.com/pulse/microsoft-office-2016-has-been-released-kevin-conger>>, Oct. 13, 2015, 5 Pages.

Hachman, Mark, "Microsoft Rewards is How Microsoft will Pay You to Use Edge, Bing and More", Retrieved from <<http://www.cio.com/article/3109207/windows/microsoft-rewards-is-how-microsoft-will-pay-you-to-use-edge-bing-and-more.html>>, Aug. 17, 2016, 4 Pages.

Merrick, Jordan, "iCloud Photo Sharing With Shared Photo Streams", Retrieved from <<https://web.archive.org/web/20140309082835/http://www.theinstructional.com/guides/icloud-photo-sharing-with-shared-photo-streams>>, Feb. 24, 2014, 16 Pages.

Murphy, Melissa, "Everything You Need to Know about Sharing in Google Docs", Retrieved from <<https://web.archive.org/web/20151207162406/http://computers.tutsplus.com/articles/everything-you-need-to-know-about-sharing-in-google-docs--cms-20676>>, Apr. 29, 2014, 20 Pages.

Narayanan, Hari, "Launching Document Management for Zoho Projects Powered by Zoho Docs", Retrieved from <<https://www.zoho.com/projects/blog/launching-document-management-for-zoho-projects-powered-by-zoho-docs.html>>, Mar. 18, 2015, 26 Pages.

Tweedie, Steven, "This Sleek App Could Be Your New Favorite Tool for Collaboration", Retrieved from <<http://www.businessinsider.in/This-Sleek-App-Could-Be-Your-New-Favorite-Tool-For-Collaboration/articleshow/41210467.cms>>, Aug. 29, 2014, 15 Pages.

"Non-Final Office Action Issued in U.S. Appl. No. 14/788,761", dated Jun. 14, 2017, 20 Pages.

"Final Office Action Issued in U.S. Appl. No. 14/788,761", dated Dec. 13, 2017, 27 Pages.

U.S. Appl. No. 16/185,160, filed Nov. 9, 2018, Jade Kessler.

"Non Final Office Action Issued in U.S. Appl. No. 16/185,160", dated Jan. 27, 2020, 15 Pages.

* cited by examiner

GRAPHICAL USER INTERFACE FACILITATING UPLOADING OF ELECTRONIC DOCUMENTS TO SHARED STORAGE

CROSS REFERENCE TO RELATED APPLICATIONS

This application is a continuation-in-part application from U.S. Non-Provisional patent application Ser. No. 14/788, 761, filed Jun. 30, 2015, now granted as U.S. Patent Number 10,154,078.

BACKGROUND

The availability of shared storage systems for electronic documents has increased the ability of computer end users to share and collaborate in the creation of a variety of electronic documents. End users can cause electronic documents to be stored in shared storage systems on a computer network, such as the internet. End users can instruct such a shared storage system to allow electronic documents to be shared with other end users of the shared storage system. A shared storage system generally has an access control component in a file system that tracks the access rights users have for each electronic document. In many typical end user scenarios, an end user may create and store an electronic document in local storage on an end user computer, and then upload the electronic document to the shared storage system. Storing the electronic document in a shared storage system can be accomplished on the end user computer, for example, by using a "save as" operation of an application, or a file move or copy operation of a file system, or an upload operation of a client application of the shared storage system, to store the electronic document directly in the shared storage system or in a directory of the end user computer file system which is synchronized with the shared storage system.

After an electronic document has been shared with two or more end users, the shared storage system manages access to the shared electronic document to ensure consistency of the electronic document, especially in the case of collaborative modifications to the electronic document. A kind of collaboration system, typically resident on a server computer that is configured to access the file system of the shared storage system, typically is involved in managing this collaborative modification by tracking which users currently are accessing an electronic document.

SUMMARY

This Summary is provided to introduce a selection of concepts in a simplified form that are further described below in the Detailed Description. This Summary is intended neither to identify key or essential features, nor to limit the scope, of the claimed subject matter.

An end user application running on a computer, for the purpose of collaborative modification of shared electronic documents, is configured to provide a graphical user interface that facilitates storing an electronic document in shared storage. This graphical user interface includes a graphical element that conveys information about shared status of the currently accessed electronic document to the end user. Through input devices of the end user computer, an end user can manipulate this graphical element. In response to certain manipulations of this graphical element, the end user computer determines whether the currently accessed electronic document would support collaborative editing if it were stored in shared storage. In response to a determination that collaborative editing would be supported, the graphical user interface is further configured to prompt the user to share the electronic document with others. In response to input indicative sharing of the electronic document, the graphical user interface stores the electronic document in shared storage with sharing settings as input by the user.

Such a graphical user interface allows an electronic document to be quickly shared improves user efficiency and productivity in collaborative editing of electronic documents.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

Figure 1:
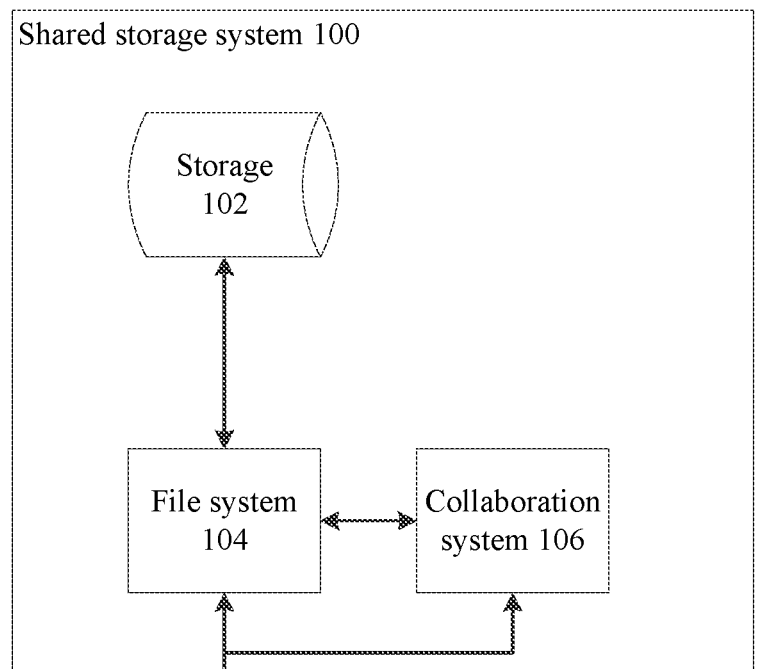
FIG. 1 is a block diagram of an example computer system configured to share electronic documents among users.
Figure 1:
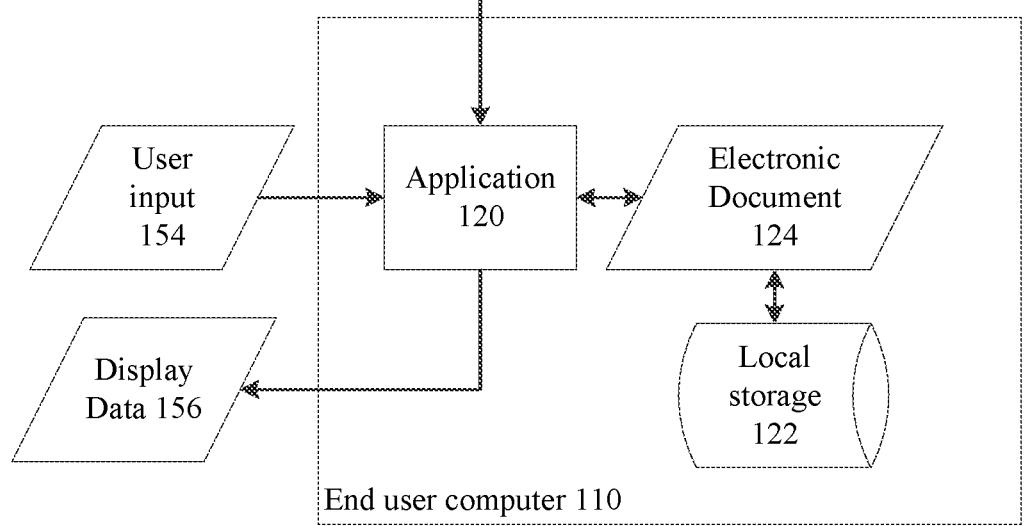

FIG. 1 is a block diagram of an example computer system configured to support sharing and collaborative modification of electronic documents by multiple end users using multiple end user computers.

A computer system that is configured to support sharing and collaborative modification of electronic documents by multiple end users includes a shared storage system 100. The shared storage system 100 generally includes storage 102 in which data is stored in data files accessible through a file system 104 that is part of the shared storage system. The file system configures a server computer to maintain information about each file stored in storage 102. The shared storage system 100 can be implemented using one or more general purpose computers, such as described in connection with FIG. 6, and configured to implement a server computer that is responsive to requests over a computer network to access, through the file system, files on the storage 102.

Multiple end user computers 110 are connected to the shared storage system for communication over a computer network 112, such as the internet. An end user computer 110 can be a computer such as described in connection with FIG. 6 and configured as an end user computer running one or more applications 120. Examples of such a computer include, but are not limited to, a tablet computer, a slate computer, a notebook computer, a desktop computer, a virtual desktop computer hosted on a server computer, a handheld computer, and a mobile phone including a computer and applications. The computer network 112 can be any computer network supporting interaction between the end user computers and the shared storage system, such as a local area network or a wide area network, whether private and/or publicly accessible, and can include wired and/or wireless connectivity. The computer network can be implemented using any of a number of available network communication protocols, including but not limited to Ethernet and TCP/IP.

An end user computer 110 includes one or more applications 120. An application is a computer program executed on the end user computer that configures the computer to be responsive to user input 154 to allow an end user to interactively modify an electronic document 124. An electronic document can include any kind of data, such as text, still images, video and audio. The application processes the electronic document, in response to user input through input devices, by selecting and combining portions of data to create the content of the electronic document, by displaying or otherwise presenting display data 156, such as a graphical user interface including the content the electronic document, through output devices (not shown) to the end user, and by storing the electronic document in memory and/or in a data file in local storage 122 of the end user computer.

A variety of kinds of applications can be used on an end user computer. Examples of an application include, but are not limited to, a word processing application, a presentation application, a note taking application, a text editing application, a paint application, an image editing application, a spreadsheet application, a desktop publishing application, a drawing application, a video editing application, and an audio editing application.

An application generates an electronic document 124 that is stored in a data file. Such a data file can be stored in local storage 122 and/or the shared storage system 100. The electronic document, while being modified by an end user on the end user computer, also is temporarily stored in memory on the end user computer.

When an electronic document is stored in a data file in the shared storage system 100, the file system 104 of the shared storage system includes information indicating a sharing state of the electronic document. Such information can be in the form of access controls indicating which end users are authorized to access the electronic document. The file system also can be configured to be responsive to a query to provide this information to another application, such as application 120 on an end user computer. An end user can view and modify the sharing state of an electronic document in a number of ways.

If an electronic document is stored in a data file in the shared storage system 100, and the data file is shared, with modification rights, with at least one more end user, then two or more end user computers may access and attempt to modify the electronic document. To handle such a condition, the shared storage system can include a kind of collaboration system 106. The collaboration system 106 is a computer program that configures the server computer to manage access to shared electronic documents in the shared storage system 100.

The collaboration system 106 is configured to store information about end users that are currently accessing the electronic document. The collaboration system can be configured to be responsive to a query to provide this information to another application on an end user computer, such as application 120.

Using the information about end users currently accessing an electronic document, the collaboration system can implement any of a number of different techniques for coordinating access to the electronic document to ensure consistency of the electronic document. For example, the collaboration system can prevent one user from writing to the data file for the electronic document while another user has the data file open for writing. As another example, the collaboration system can interactively merge changes to the electronic document as such changes are being made collaboratively by multiple users. In such a case, the collaboration system merges changes received from end user computers in memory local to the collaboration system, and then transmits a modified version of the electronic document to each end user computer with an application currently accessing the electronic document.

Having now described the computer system in which an application on an end user computer can be used to interactively modify a shared electronic document, more details of the application will now be described.

Figure 2:
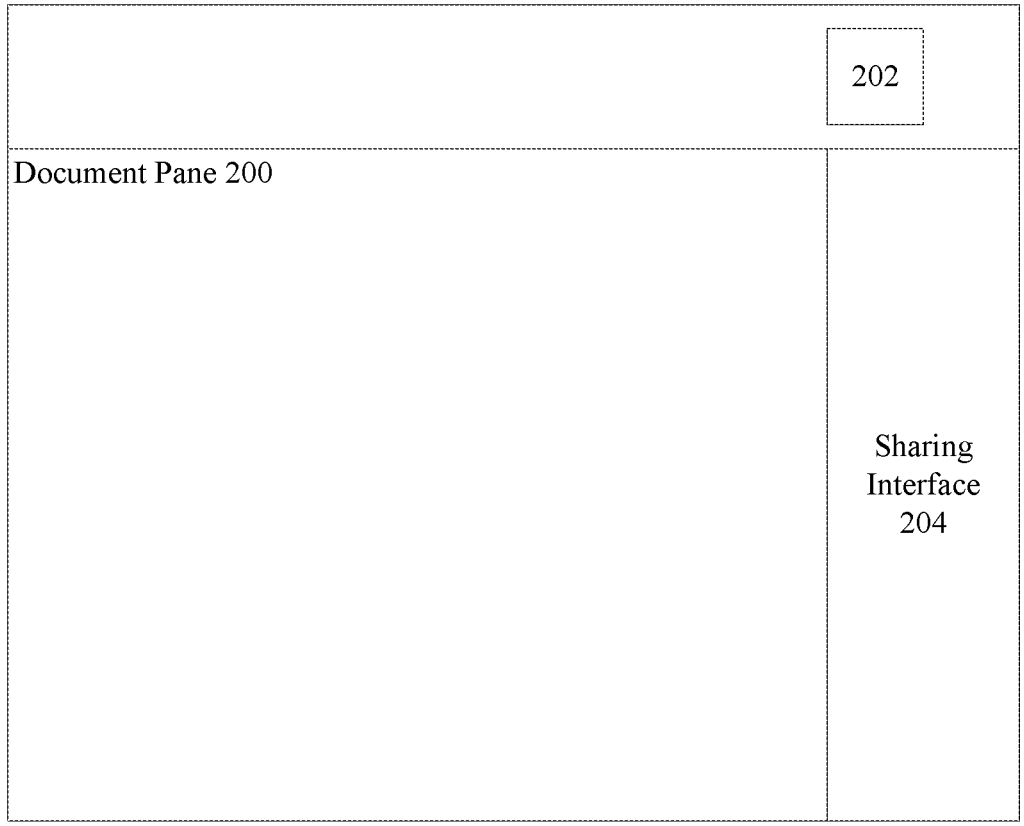
FIG. 2 an example graphical user interface for an application configured to enable a user to share an electronic document with another user.

In FIG. 2, an example graphical user interface for the application is shown. In this example graphical user interface, a document pane 200 is a primary display area in which the electronic document is presented on a display. The end user computer receives user inputs through input devices, and can associate such inputs with operations with respect to the electronic document in document pane 200, or with respect to other graphical elements in the graphical user interface. The end user computer processes some user inputs to effect modifications to the electronic document currently being accessed in the document pane 200.

The graphical user interface for the application in FIG. 2 also includes a graphical element 202 that conveys to the user sharing status information for the electronic document being edited. In one implementation, the application can dynamically update the graphical element during editing to indicate both current sharing and current co-authoring status of the currently accessed electronic document.

Through one or more input devices of the end user computer, an end user can provide inputs to manipulate this graphical element 202. The end user computer is configured to process such inputs to perform various operations, such as to instruct the end user computer to present further detailed information about the sharing status of the electronic document and to change such status. For example, the application can display, in response to manipulation of this graphical element, a sharing interface 204, as part of the graphical user interface.

As shown in FIG. 2, as an example, the sharing interface 204, or collaboration interface, in the graphical user interface can be used to present information about the sharing status and the current use of the currently accessed electronic document. The graphical user interface also provides a mechanism through which such information can be modified. This sharing interface is presented in the context of the currently accessed electronic document, i.e., the sharing interface 204 and the document pane 200 are both displayed in the graphical user interface simultaneously. As an example, in FIG. 2 the sharing interface is illustrated as a pane of the graphical user interface which is non-overlapping and non-modal with the other panes of the interface. The sharing interface 204 also can be implemented using other graphical user interface techniques, such as a modal dialog box, a call-out interface, or small pop-up window also are examples of a kind of interface that can be shown in the context of the currently accessed electronic document.

To generate the sharing interface, an application uses an identifier of the electronic document being edited, such as a file name, to access information about its sharing status. In some instances, the electronic document may already be stored in the shared storage system 100. Optionally, other information about co-authoring state also can be obtained from the collaboration system.

However, in some instances, the currently accessed electronic document resides only in local storage 122, whether in a data file or in memory. In such an instance, in response to activation of the sharing interface 204, the sharing interface prompts the user through steps for sharing the electronic document through the shared storage system, as will now be described in more detail below in connection with FIGS. 3 through 5.

Figure 3:
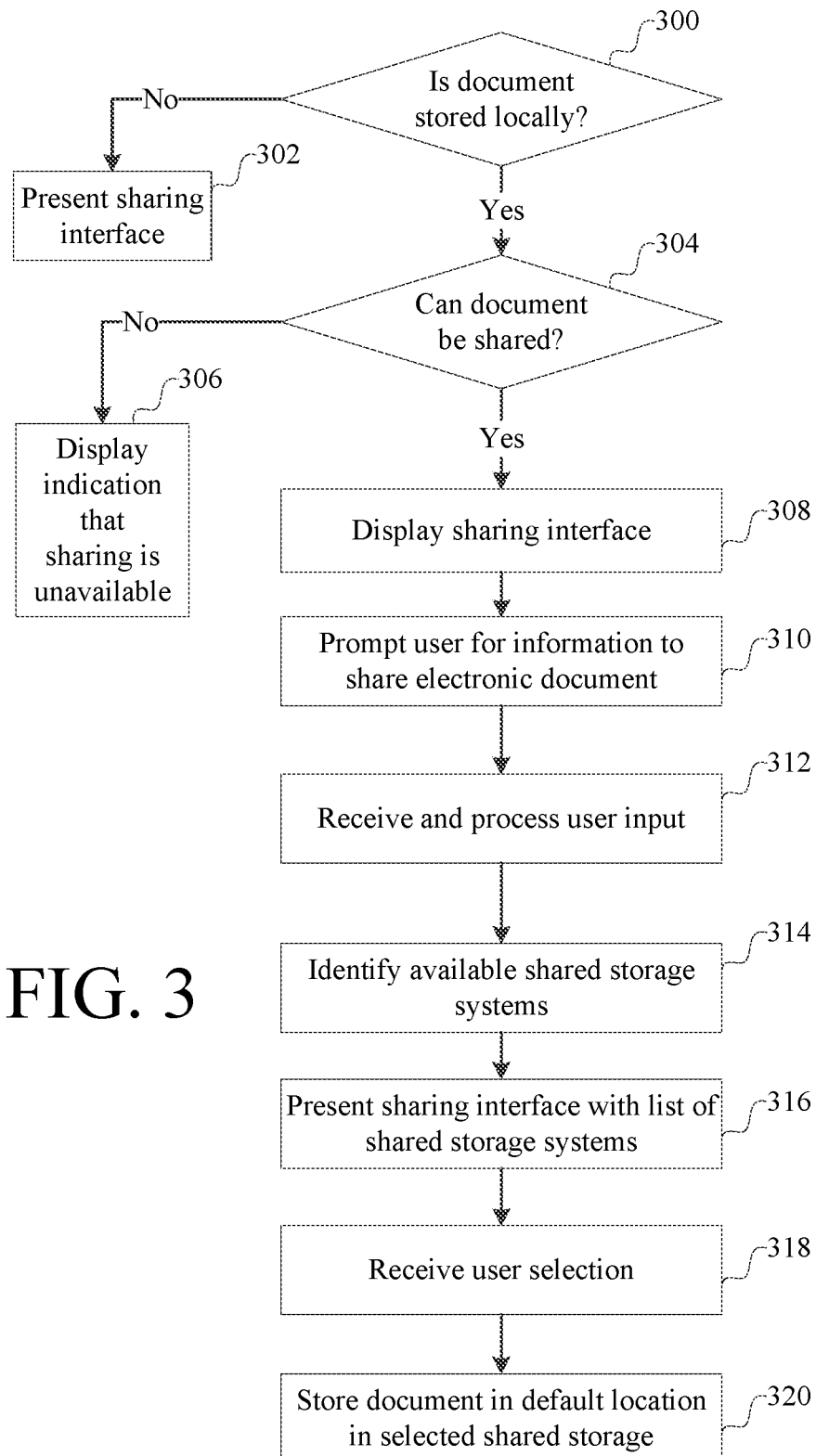
FIG. 3 is a flow chart describing an example operation of an application with a graphical user interface with a sharing interface.
Figure 5:
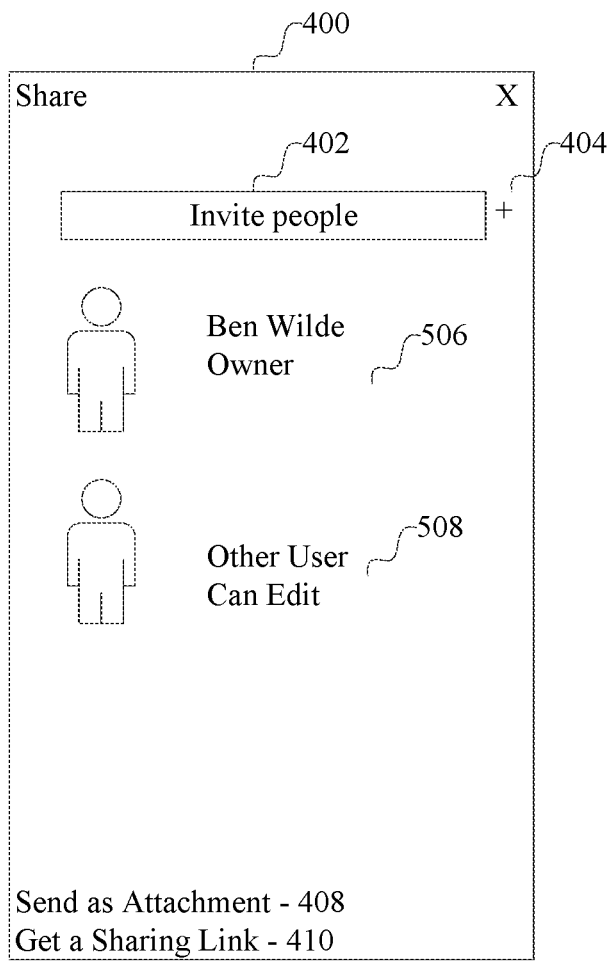
FIG. 5 is an example graphical user interface for an application with a sharing interface.

In FIG. 3, an example implementation of operation of the application is illustrated. The application determines 300 if the currently accessed electronic document is already stored in a supported shared storage system, or is stored in local storage or other form of storage, or in a format, that is otherwise not a supported shared storage system. If the document already is in a supported shared storage system, a graphical user interface for the sharing status of the electronic document is displayed 302, such as shown in FIG. 5.

If the electronic document is, however, in local storage or other storage that is not a supported shared storage system, then the application determines 304 whether the electronic document can be stored in an available shared storage system to allow sharing of the electronic document for a collaboration function. The application can determine whether the electronic document can be shared in a number of different ways, and by considering a number of different conditions.

For example, the application can determine, either directly or through the operating system of the end user computer, if the end user computer has access to one or more online shared storage systems in which the electronic document can be stored. For example, the end user computer may have an application, such as the operating system, which maintains information about accounts to which the end user computer can connect. The application can determine whether there are any such accounts for shared storage and whether those services are currently available (e.g., whether there is a network connection available, and whether the services are online).

As another example, the application can determine if the file format of the electronic document supports sharing. For example, some collaborative systems require a shared electronic document to be in a particular file format. In some implementations, the application can prompt the user to change the file format if the current file format cannot be used with the collaborative system to be accessed. Alternatively, the application can determine that sharing is not available for an electronic document due to the current file format for the electronic document.

As another example, the application can determine if the electronic document has restrictions, such as access control or rights management controls, which prevent the electronic document from being shared. If such controls are the kind that prevent sharing of an electronic document, then the application can determine that sharing is not available for the electronic document.

If the electronic document cannot be shared, then some indication of the unavailability of sharing can be displayed, as indicated at 306. For example, the graphical user interface may indicate that the electronic document is not stored in a shared storage system, or that the shared storage system is unavailable, for example due to a lack of a network connection, or that the electronic document has the wrong file format, or that the electronic document has or access controls, or other restrictions, which prevent the electronic document from being shared. The graphical user interface can present the user with an option to save the electronic document in a new file format and/or in a new storage location, and/or without access controls or other restrictions.

Figure 4A:
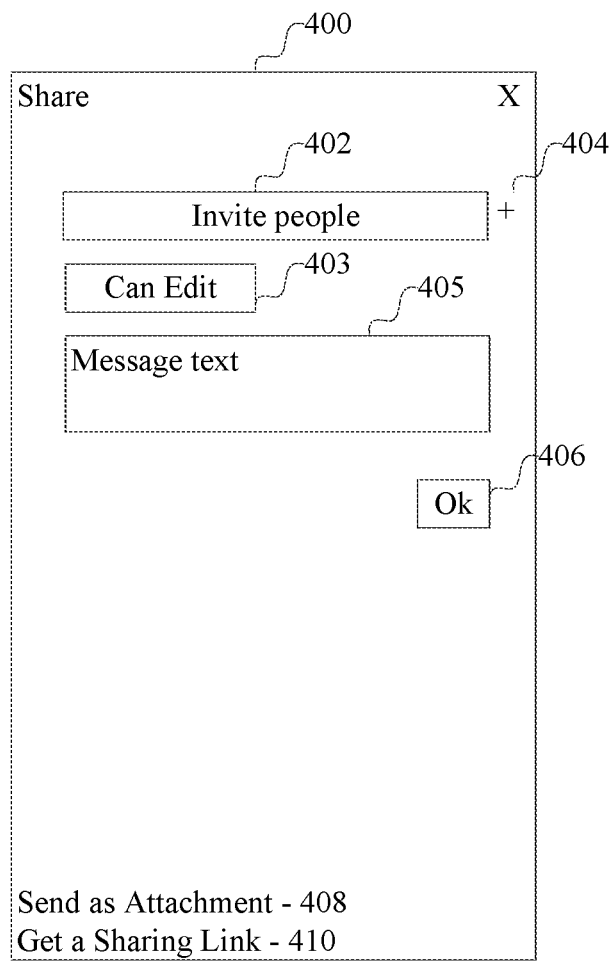
FIGS. 4A and 4B are an example graphical user interface for an application with a sharing interface.

In response to determining that the electronic document can be shared, a sharing interface is displayed 308, such as shown in FIG. 4A. The sharing interface can prompt 310 the end user, for example, for a user identifier for any end user with whom the electronic document is to be shared. Such a user identifier can include, for example, an electronic mail (e-mail) address, instant messaging address, other contact information, or a username. In response to user input received 312 through this sharing interface, such as the selection of a user or input of a user identifier, the user input is processed, and the sharing interface is updated.

Figure 4B:
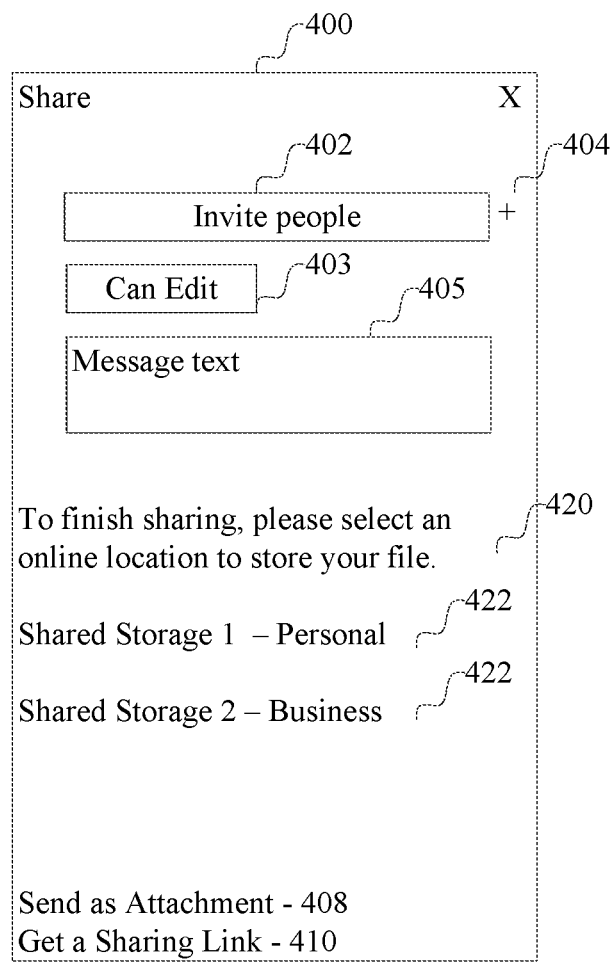

After one or more other users are identified, the graphical user interface can allow the user to share the electronic document with the identified users. In response to user input indicating the electronic document is to be shared with the identified users, the graphical user interface can prompt the user for further input about the shared storage system in which the electronic document will be shared, as shown in FIG. 4B. For example, the application can identify 314 available shared storage systems. For example, the end user computer may store information about accounts for shared storage systems to which the end user computer is currently connected. Such information may be accessible to the application directly, or through the operating system, or from another application on the end user computer. After the application identifies a list of available shared storage systems, the list of the available shared storage systems can be presented 316 in the sharing interface, as shown in FIG. 4B, with a prompt to the user to select one of the shared storage systems.

The application then can receive 318 user input indicative of a selection of one of the available shared storage systems. The electronic document is then stored 320 in this end user's account in the shared storage system with sharing settings set to share the electronic document with the other users identified above. A default location, such as a root directory or other designated directory, in the selected shared storage system can be used to store the electronic document.

The file system of the shared storage system, or the application, can be configured to automatically resolve any naming conflict between a file name used for the currently accessed electronic document and any other electronic documents in the directory. The application can be configured to provide, to the file system, a file name for an electronic document. Alternatively, the file system can be configured to provide a default file name for the electronic document. In response to an attempt to create or open a new file for write access, given the file name for the electronic document, the file system signals an error if there is any naming conflict. In response to any naming conflict, the application or the file system can be configured to automatically resolve the conflict, i.e., without prompting the user or other kind of further user interaction or intervention. For example, a number or other characters can be appended to the file name until the naming conflict is overcome. By automatically addressing the naming conflicts, the application can store the electronic document directly in the shared storage system without further user interaction or intervention.

After the electronic document is stored in the shared storage system, the application can modify its context for editing the electronic document. In particular, prior to sharing the electronic document, the application referenced a local copy of the electronic document in memory and/or in a file in local storage. A local file may have been open for write access. The application can close any local file and then changes its context to indicate that the electronic document being editing in local memory is from the shared storage system.

Turning now to FIGS. 4A-4B and 5, an example implementation of the sharing interface, as a non-overlapping pane adjacent to a document pane, will now be described.

In FIG. 4A, an example initial state of the sharing interface is shown at 400. In FIG. 4A, in this state of the sharing interface, the sharing interface permits a user to identify other users with whom to share the electronic document. In FIG. 4A, the sharing interface includes an input box 402 in which a user can enter, and through which the computer interactively displays, a user identifier, such as a user name, an email address, or other contact information, to identify a user with whom the electronic document is to be shared. A menu 403, or other selection mechanism, allows a user to select access rights for the identified user, such as whether the user can edit or can only read the document. A text box 405 allows a user to enter a message to be sent to the other user when the document is shared. Another graphical element, such as the "+" symbol shown at 404, is configured to be manipulated by an end user, in response to which the user identified in the input box 402 is added to the sharing for the electronic document. Any number of users can be added in this manner. When the user has completed entering identifiers for other users, the user can select the "OK" button 406, and the user interface transitions to state as shown in FIG. 4B.

In the state of the sharing interface shown in FIG. 4B, which can be shown if the electronic document is not yet in shared storage, the sharing interface allows a user to select a shared storage system. The interface includes a prompt 420, and any number of indications 422 of shared storage systems to which the application currently has access. In response to a user selecting one of the displayed indications of available shared storage systems, the electronic document is stored and shared with the other users which the user indicated at 402.

After the electronic document is stored in shared storage and is ready to be shared with others, the user interface can appear as shown in FIG. 5. Information describing the users with which the electronic document is shared can be shown at 506 and 508. A user identifier, such as a user name and/or picture, and a status, such as "owner", "co-author", or "shared" can be displayed. In this example in FIG. 5, the electronic document has been shared by the owner 506 with one other user 508 for editing. The information about the users with which an electronic document is shared can be presented in an order based on sorting information the users, such as the user's status or other information. For example, the owner can be shown first, followed by current co-authors, followed by other users with whom the electronic document is shared, but who are currently not accessing the document. In this interface, one or more parts of the interface for adding another user, such as text box 402 (and optionally menu 403 or message text box 405, not shown in FIG. 5), also can be shown to allow a user to share the document with additional other users.

The sharing interface as shown in any of FIGS. 4A, 4B and 5 also can include other prompts 408 and 410 from which a user can select other ways to share, such as by sending the file as an attachment in an electronic message (408) or by sending a link to the file (410). The prompt 410 to send a link may be inactive or unavailable, or not shown, until the electronic document is stored in the shared storage system from which the link will be shared.

It should be understood that the foregoing description is merely an example of implementations of such a sharing interface and that the sharing interface can provide yet additional functionality and can have several implementations.

It should be understood that the foregoing description is merely an example of an implementation of a computer system configured to support collaborative modification of electronic documents stored in a shared storage system.

By having an application provide a graphical user interface that allows an electronic document to be quickly shared through a shared storage system, user efficiency and productivity in collaborative modification of electronic documents is improved. Such a graphical user interface facilitates access to the shared storage system and shared status of an electronic document.

Accordingly, in one aspect a computer comprises a processing system comprising one or more processing units and storage, and a network interface configured to connect the computer to computer network. The computer network is connected to a shared storage system, the shared storage system comprising a file system configured to store a plurality of electronic documents and to make the plurality of electronic documents available to a plurality of users. The storage of the processing system comprises computer program code that, when executed by the processing system, configures the processing system to be comprising an application. The application is operative to process user input to modify an electronic document. The application has a graphical user interface including a document pane displaying the electronic document and a graphical element representing sharing status. The application further is operative, in response to a selection of the graphical element to collaborate with the electronic document, to display a collaboration interface in the graphical user interface, and determine whether the electronic document can be shared in an available shared storage system to store the electronic document for a collaboration function. In response to a determination that the electronic document can be shared in an available shared storage system for the collaboration function, the application is operative to present in the collaboration interface a request for input for the collaboration function, and, in response to receiving input for the collaboration function, present in the collaboration interface a request for input designating an available shared storage system to store the electronic document.

In another aspect an article of manufacture comprises at least one computer storage medium comprising at least one of a memory device and a storage device, with computer program instructions stored on the at least one computer storage medium. The computer comprises a processing system comprising one or more processing units and storage and a network interface configured to connect the computer to a computer network. The computer network is connected to a shared storage system, the shared storage system comprising a file system configured to store a plurality of electronic documents and to make the plurality of electronic documents available to a plurality of users. The computer program instructions, when processed by a processing system of a computer, configure the processing system to be comprising an application. The application is operative to process user input to modify an electronic document. The application has a graphical user interface including a document pane displaying the electronic document and a graphical element representing sharing status. The application further is operative, in response to a selection of the graphical element to collaborate with the electronic document, to display a collaboration interface in the graphical user interface, and determine whether the electronic document can be shared in an available shared storage system to store the electronic document for a collaboration function. In response to a determination that the electronic document can be shared in an available shared storage system for the collaboration function, the application is operative to present in the collaboration interface a request for input for the collaboration function, and, in response to receiving input for the collaboration function, present in the collaboration interface a request for input designating an available shared storage system to store the electronic document.

In another aspect, a computer-implemented process comprises processing user input to modify an electronic document. The modified electronic document is displayed in a graphical user interface including a document pane configured to display the electronic document and a graphical element representing sharing status. In response to the electronic document not being stored in a shared storage system and in response to a selection of the graphical element to share the electronic document, a collaboration interface is displayed in the graphical user interface. Whether the electronic document can be shared in an available shared storage system to store the electronic document is determined. In response to a determination that the electronic document can be shared in an available shared storage system for the collaboration function, the collaboration interface presents a request for input for the collaboration function. In response to receiving input for the collaboration function, the interface presents a request for input designating an available shared storage system to store the electronic document.

In any of the foregoing aspects, the application can be further configured, in response to selection of an available shared storage system, to store the electronic document in the shared storage system.

In any of the foregoing aspects, the application can be further configured to store the electronic document in a default directory in the shared storage system.

In any of the foregoing aspects, the application can be further configured to automatically resolve naming conflicts of the electronic document and other electronic documents stored in the shared storage system, such as in a default directory of the shared storage system.

In any of the foregoing aspects, the application can be further configured to interactively update the sharing interface in the graphical user interface with sharing status information for the currently accessed electronic document while the electronic document is accessed by the application and displayed in the graphical user interface.

In any of the foregoing aspects, presenting of information in the sharing interface can include any conveyance of information through an output device of the computer, such as by display, audio output or other output to be perceived by an end user.

In any of the foregoing aspects, the collaboration interface can be displayed in the context of the currently accessed electronic document. The collaboration interface and the document pane can be both displayed in the graphical user interface simultaneously. The collaboration interface can be adjacent to the document pane. The collaboration interface can be a pane of the graphical user interface which is non-overlapping and non-modal with the document pane.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

Figure 6:
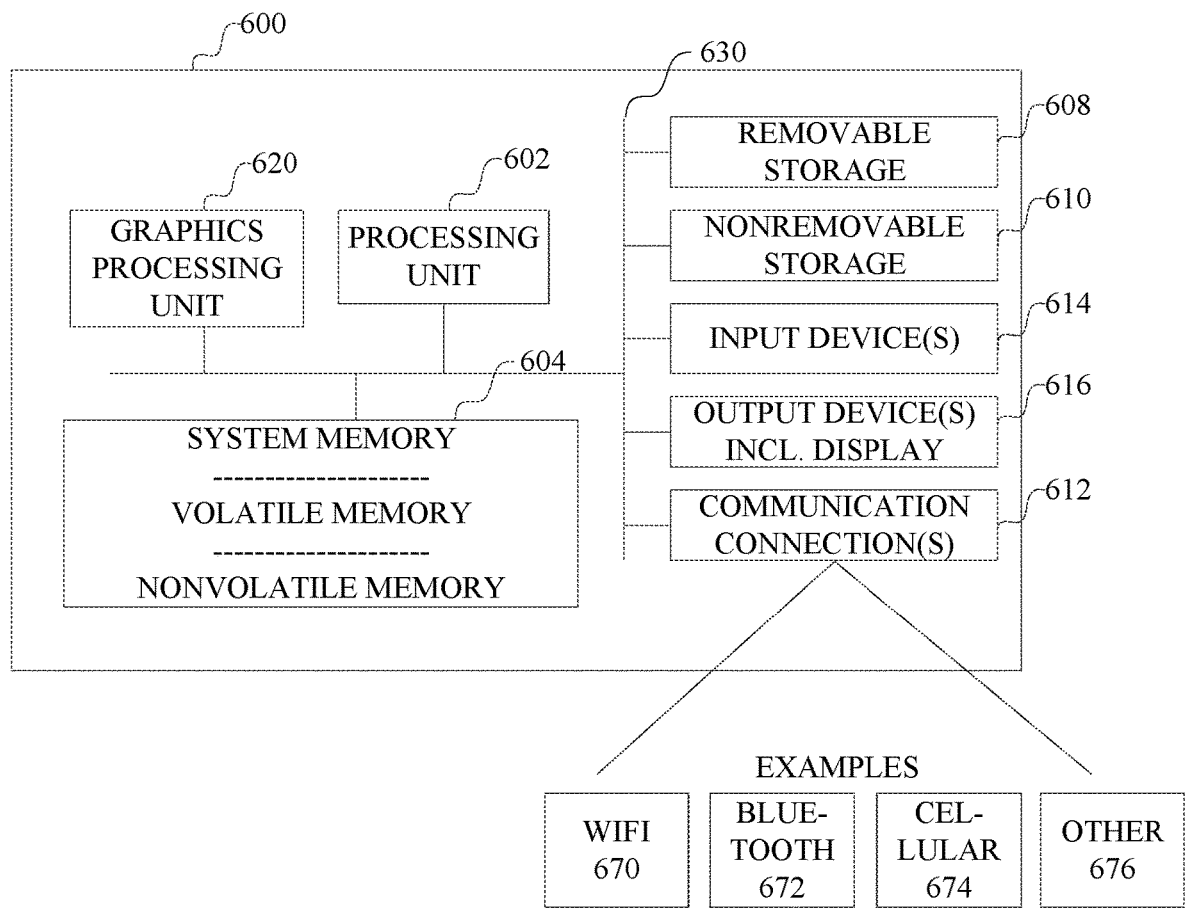
FIG. 6 is a block diagram of an example computer in which components of such a system can be implemented.

Having now described an example implementation, FIG. 6 illustrates an example of a computer with which components of the computer system of the foregoing description can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones including but not limited to "smart" phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 6, a computer 600 includes a processing system comprising at least one processing unit 602 and at least one memory 604. The processing unit 602 can include multiple processing devices; the memory 604 can include multiple memory devices. A processing unit 602 comprises a processor which is logic circuitry which responds to and processes instructions to provide the functions of the computer. A processor can include one or more processing cores (not shown) that are multiple processors within the same logic circuitry that can operate independently of each other. Generally, one of the processing units in the computer is designated as a primary processor, typically called the central processing unit (CPU). One or more additional co-processing units 620, such as a graphics processing unit (GPU) or other logic devices, also can be present in the computer. A co-processing unit comprises a processor or other logic device that performs operations that supplement the central processing unit, such as but not limited to graphics operations and signal processing operations. Such co-processing units or other logic device may be located within some of the other components of the computer.

The memory 604 may include volatile computer storage devices (such as dynamic random access memory (DRAM) or other random access memory device), and non-volatile computer storage devices (such as a read-only memory, flash memory, and the like) or some combination of the two. A nonvolatile computer storage device is a computer storage device whose contents are not lost when power is removed. Other computer storage devices, such as dedicated memory or registers, also can be present in the one or more processors. The computer 600 can include additional computer storage devices (whether removable or non-removable) such as, but not limited to, magnetically-recorded or optically-recorded disks or tape. Such additional computer storage devices are illustrated in FIG. 6 by removable storage device 608 and non-removable storage device 610. Such computer storage devices 608 and 610 typically are nonvolatile storage devices. The various components in FIG. 6 are generally interconnected by an interconnection mechanism, such as one or more buses 630.

A computer storage device is any device in which data can be stored in and retrieved from addressable physical storage locations by the computer by changing state of the device at the addressable physical storage location. A computer storage device thus can be a volatile or nonvolatile memory, or a removable or non-removable storage device. Memory 604, removable storage 508 and non-removable storage 610 are all examples of computer storage devices. Some examples of computer storage devices are RAM, ROM, EEPROM, flash memory, processor registers, or other memory technology, CD-ROM, digital versatile disks (DVD) or other optically or magneto-optically recorded storage device, magnetic cassettes, magnetic tape, magnetic disk storage or other magnetic storage devices. Computer storage devices and communication media are distinct categories, and both are distinct from signals propagating over communication media.

Computer 600 also may include communications connection(s) 612 that allow the computer to communicate with other devices over a communication medium. Communication media transmit data, such as computer program instructions, data structures, program modules or other data, over a wired or wireless substance by propagating a modulated data signal such as a carrier wave or other transport mechanism over the substance. The term "modulated data signal" means a signal that has one or more of its characteristics set or changed in such a manner as to encode information in the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals.

In a computer, example communications connections include, but are not limited to, a wireless communication interface for wireless connection to a computer network, and one or more radio transmitters for telephonic communications, such as over cellular telephone networks. For example, communications connections 612 are devices, such as a wired network interface, wireless network interface, radio frequency transceiver, e.g., WiFi 670, cellular 674, long term evolution (LTE) or Bluetooth 672, etc., transceivers, navigation transceivers, e.g., global positioning system (GPS) or Global Navigation Satellite System (GLONASS), etc., transceivers, and network interface devices 676, e.g., Ethernet, etc., or other device, that interface with communication media to transmit data over and receive data from signal propagated over the communication media. Such connections support communication with other devices. One or more processes may be running on the computer and managed by the operating system to enable voice or data communications over such connections.

The computer 600 may have various human and machine input device(s) 614 such as a pointer device, keyboard, touch-based input device, pen, camera, microphone, sensors, such as accelerometers, gyroscopes, thermometers, light sensors and the like, and so on. The computer 1200 may have various output device(s) 616 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various computer storage devices 608 and 610, communication connections 612, output devices 616 and input devices 614 can be integrated within a housing with the rest of the computer, or can be connected through various input/output interface devices on the computer, in which case the reference numbers 608, 610, 612, 614 and 616 can indicate either the interface for connection to a device or the device itself as the case may be.

A computer generally includes an operating system, which is a computer program that, when executed, manages access, by other applications running on the computer, to the various resources of the computer. There may be multiple applications. The various resources include the memory, storage, input devices and output devices, such as display devices and input devices as shown in FIG. 1. To manage access to data stored in nonvolatile computer storage devices, the computer also generally includes a file system which maintains files of data. A file is a named logical construct which is defined and implemented by the file system to map a name and a sequence of logical records of data to the addressable physical locations on the computer storage device. Thus, the file system hides the physical locations of data from applications running on the computer, allowing applications to access data in a file using the name of the file and commands defined by the file system, A file system generally provides at least basic file operations such as creating a file, opening a file, writing a file or its attributes, reading a file or its attributes, and closing a file.

The various modules, tools, or applications, and data structures and flowcharts of FIGS. 1-5, as well as any operating system, file system and applications on a computer in FIG. 6, can be implemented using one or more processing units of one or more computers with one or more computer programs processed by the one or more processing units.

A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures. Generally speaking, such components and modules have inputs and outputs through locations in memory or processor registers from which data in such data structures can be read and to which data in such data structures can be written when the component or module is executed by the computer.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

It should be understood that the subject matter defined in the appended claims is not necessarily limited to the specific implementations described above. The specific implementations described above are disclosed as examples only.

What is claimed is:

1. A computer configured to connect to a shared storage system over a computer network, the shared storage system storing a plurality of electronic documents and being accessible to a plurality of computers over the computer network, the computer comprising:
   computer storage including local storage storing electronic documents; and
   a processing system comprising one or more processing units, the computer storage comprising computer program code that, when executed by the processing system, configures the computer to be further comprising:
      an application comprising computer program instructions stored in the computer storage and executed by the processing system to process user input to modify content of an electronic document, the application comprising a graphical user interface including a document pane comprising display data representing content of the electronic document being modified and a graphical element providing access to sharing status of the electronic document being modified, wherein the graphical element and the document pane are both displayed within the graphical user interface of the application, wherein the electronic document being modified is stored only in the local storage;
      wherein the application, in response to a selection of the graphical element providing access to the sharing status:
         displays a collaboration interface in the graphical user interface of the application, while the electronic document being modified is displayed in the document pane,
         presents in the collaboration interface a request for input for a collaboration function, the request comprising a prompt to a first user to enter one or more collaborative user identifiers for one or more collaborative users that differ from a user identifier for the first user, each collaborative user identifier being at least one of a collaborative user name or a collaborative user email address, and
         after receiving input for the collaboration function, causes the electronic document being modified to be stored on the shared storage system and causes the electronic document being modified as stored on the shared storage system to be shared with the one or more collaborative users according to the received input for the collaboration function.

2. The computer of claim 1, wherein the request for input for the collaboration function further comprises a prompt requesting a selection of an available shared storage system.

3. The computer of claim 1, wherein storing the electronic document being modified in the shared storage system comprises storing the electronic document in a default directory in the shared storage system.

4. The computer of claim 3, wherein storing the electronic document in the default directory in the shared storage system comprises automatically resolving naming conflicts of the electronic document and other electronic documents stored in the default directory of the shared storage system.

5. The computer of claim 1, wherein the application further interactively updates the collaboration interface in the graphical user interface with sharing status information for the electronic document being modified while the electronic document is accessed by the application and displayed in the document pane of the graphical user interface.

6. The computer of claim 1, wherein the request for input for the collaboration function further comprises a prompt requesting text for a message to be sent to the one or more collaborative users when the electronic document is stored in the shared storage system.

7. The computer of claim 1, wherein the request for input for the collaboration function further comprises a prompt requesting a selection of access rights for the one or more collaborative users to access the electronic document as stored on the shared storage system.

8. An article of manufacture comprising:
   at least one computer storage medium,
      computer program instructions stored on the at least one computer storage medium which, when processed by a processing system of a computer, the processing system comprising one or more processing units and computer storage, configures the computer to be comprising:
         an application comprising computer program instructions stored in the computer storage and executed by the processing system to process user input to modify content of an electronic document, the application comprising a graphical user interface including a document pane comprising display data representing content of the electronic document being modified and a graphical element providing access to sharing status of the electronic document being modified, wherein the graphical element and the document pane are both displayed within the graphical user interface of the application, wherein the electronic document being modified is stored only in local storage;
         the application, in response to a selection of the graphical element providing access to sharing status:
            displaying a collaboration interface in the graphical user interface, while the electronic document being modified is displayed in the document pane,
            presenting in the collaboration interface a request for input for a collaboration function, the request comprising a prompt to a first user to enter one or more collaborative user identifiers for one or more collaborative users that differ from a user identifier for the first user, each collaborative user identifier being at least one of a collaborative user name or a collaborative user email address, and
            after receiving input for the collaboration function, causing the electronic document being modified to be stored on a shared storage system accessed by the computer over a computer network and causing the electronic document being modified as stored on the shared storage system to be shared with the one or more collaborative users according to the received input for the collaboration function.

9. The article of manufacture of claim 8, wherein the request for input for the collaboration function further comprises a prompt requesting a selection of an available shared storage system.

10. The article of manufacture of claim 8, wherein storing the electronic document being modified in the shared storage system comprises storing the electronic document in a default directory in the shared storage system.

11. The article of manufacture of claim 10, wherein storing the electronic document being modified in the shared storage system comprises automatically resolving naming conflicts of the electronic document and other electronic documents stored in the default directory of the shared storage system.

12. The article of manufacture of claim 8, wherein the application interactively updates the collaboration interface in the graphical user interface with sharing status information for the electronic document being modified while the electronic document is accessed by the application and displayed in the document pane of the graphical user interface.

13. The article of manufacture of claim 8, wherein the request for input for the collaboration function further comprises a prompt requesting text for a message to be sent to the one or more collaborative users when the electronic document is stored in the shared storage system.

14. The article of manufacture of claim 8, wherein the request for input for the collaboration function further comprises a prompt requesting a selection of access rights for the one or more collaborative users to access the electronic document as stored on the shared storage system.

15. A computer-implemented method comprising:
processing, by an application executing on a computer, user input to modify content of an electronic document, the application comprising a graphical user interface including a document pane comprising display data representing content of the electronic document being modified and a graphical element providing access to sharing status of the electronic document being modified, wherein the electronic document being modified is stored only in local storage;
in response to a selection of the graphical element providing access to the sharing status:
   displaying a collaboration interface in the graphical user interface of the application, while the electronic document being modified is displayed in the document pane,
   presenting in the collaboration interface a request for input for a collaboration function, the request comprising a prompt to a first user to enter one or more collaborative user identifiers for one or more collaborative users that differ from a user identifier for the first user, each collaborative user identifier being at least one of a collaborative user name or a collaborative user email address, and
   after receiving input for the collaboration function, causing the electronic document being modified to be stored on a shared storage system accessed by the computer over a computer network and causing the electronic document being modified as stored on the shared storage system to be shared with the one or more collaborative users according to the received input for the collaboration function.

16. The computer-implemented method of claim 15, wherein the request for input for the collaboration function further comprises a prompt requesting a selection of an available shared storage system, the process further comprising, in response to a selection of an available shared storage system, storing the electronic document in the selected shared storage system.

17. The computer-implemented method of claim 15, wherein causing the electronic document being modified to be stored on the shared storage system comprises storing the electronic document in a default directory in the shared storage system.

18. The computer-implemented method of claim 17, wherein causing the electronic document being modified to be stored on the shared storage system comprises automatically resolving naming conflicts of the electronic document and other electronic documents stored in the default directory of the shared storage system.

19. The computer-implemented method of claim 15, further comprising interactively updating the collaboration interface in the graphical user interface with sharing status information for the electronic document being modified while the electronic document is accessed by the application and displayed in the document pane of the graphical user interface.

20. The computer-implemented method of claim 15, wherein the request for input for the collaboration function further comprises a prompt requesting a selection of access rights for the one or more collaborative users to access the electronic document as stored on the shared storage system.

\* \* \* \* \*